US007948962B2

(12) United States Patent
Calvert et al.

(10) Patent No.: US 7,948,962 B2
(45) Date of Patent: May 24, 2011

(54) CELLULAR COMMUNICATION SYSTEM, APPARATUS AND METHOD FOR MANAGEMENT OF BACKHAUL RESOURCES

(75) Inventors: Stephen R. Calvert, Bath (GB); Peter J. Legg, Swindon (GB); Mark Latham, Chippenham (GB)

(73) Assignee: Wireless Technology Solutions LLC, New York, NY (US)

( * ) Notice: Subject to any disclaimer, the term of this patent is extended or adjusted under 35 U.S.C. 154(b) by 668 days.

(21) Appl. No.: 11/849,184

(22) Filed: Aug. 31, 2007

(65) Prior Publication Data

US 2009/0059790 A1  Mar. 5, 2009

(51) Int. Cl.
*H04B 7/212* (2006.01)
(52) U.S. Cl. .......................... 370/348; 370/338; 370/341
(58) Field of Classification Search ........................ None
See application file for complete search history.

(56) References Cited

U.S. PATENT DOCUMENTS

| | | | |
|---|---|---|---|
| 6,834,044 B2* | 12/2004 | Sugirtharaj et al. .......... | 370/328 |
| 6,889,050 B1* | 5/2005 | Willars et al. .............. | 455/452.2 |
| 7,145,895 B2* | 12/2006 | Mueckenheim et al. ..... | 370/348 |
| 7,505,448 B2* | 3/2009 | Sheng et al. .................. | 370/350 |
| 2003/0223454 A1* | 12/2003 | Abraham et al. ............. | 370/465 |
| 2004/0114574 A1* | 6/2004 | Zeira et al. .................... | 370/352 |
| 2005/0201289 A1* | 9/2005 | Smolinske et al. ........ | 370/236.1 |
| 2006/0018283 A1* | 1/2006 | Lewis et al. .................... | 370/331 |
| 2006/0056373 A1* | 3/2006 | Legg .............................. | 370/341 |
| 2006/0140133 A1 | 6/2006 | Isokangas | |
| 2006/0223585 A1* | 10/2006 | Legg .............................. | 455/560 |
| 2006/0256745 A1* | 11/2006 | Chao et al. ..................... | 370/295 |
| 2007/0015525 A1* | 1/2007 | Beming et al. ................ | 455/509 |
| 2007/0053331 A1* | 3/2007 | Kolding et al. ............... | 370/338 |
| 2007/0076641 A1* | 4/2007 | Bachl et al. ................... | 370/310 |
| 2007/0127522 A1* | 6/2007 | Lundh et al. .................. | 370/468 |
| 2008/0002646 A1* | 1/2008 | Hannu et al. .................. | 370/338 |
| 2008/0019305 A1* | 1/2008 | Dekorsy et al. ............... | 370/329 |
| 2008/0123542 A1* | 5/2008 | Karlsson ....................... | 370/252 |
| 2008/0188228 A1* | 8/2008 | Pecen et al. ................... | 455/449 |
| 2008/0233967 A1* | 9/2008 | Montojo et al. ........... | 455/452.2 |
| 2008/0247375 A1* | 10/2008 | Muharemovic et al. ...... | 370/344 |
| 2008/0318587 A1* | 12/2008 | Barrett ........................ | 455/452.1 |

FOREIGN PATENT DOCUMENTS

| | | |
|---|---|---|
| WO | WO 99/13624 | 3/1999 |
| WO | WO 02/51176 | 6/2002 |
| WO | WO 2007/024167 | 3/2007 |

OTHER PUBLICATIONS

International Search Report Dated Feb. 5, 2009 from PCT/EP2008/061390.

* cited by examiner

*Primary Examiner* — Phirin Sam
(74) *Attorney, Agent, or Firm* — Fitch Even Tabin & Flannery

(57) ABSTRACT

A communication network element comprises traffic scheduler logic capable of scheduling transmission of a first category of queued traffic across a backhaul interface in accordance with a rate control value. The communication network element further comprises traffic manager logic capable of scheduling transmission of a second category of queued traffic across the backhaul interface in accordance with a determined backhaul bandwidth allocation, the backhaul bandwidth allocation being based on a determination of available bandwidth across the backhaul interface not required for scheduled first category traffic.

62 Claims, 6 Drawing Sheets

CELLULAR COMMUNICATION SYSTEM, APPARATUS AND METHOD FOR MANAGEMENT OF BACKHAUL RESOURCES

FIELD OF THE INVENTION

The field of the invention relates to utilisation of communication resources in cellular communication systems and in particular, but not exclusively, to management of backhaul resources in a time-division duplex $3^{rd}$ Generation Partnership Project (3GPP) cellular communication system.

BACKGROUND OF THE INVENTION

Currently, 3rd generation cellular communication systems are being rolled out to further enhance the communication services provided to mobile phone users. The most widely adopted 3rd generation communication systems are based on Code Division Multiple Access (CDMA) and Frequency Division Duplex (FDD) or Time Division Duplex (TDD) technology. In CDMA systems, user separation is obtained by allocating different spreading and/or scrambling codes to different users on the same carrier frequency and in the same time intervals. This is in contrast to time division multiple access (TDMA) systems, where user separation is achieved by assigning different time slots to different users.

In addition, TDD provides for the same carrier frequency to be used for both uplink transmissions, i.e. transmissions from the mobile wireless communication unit (often referred to as wireless subscriber communication unit) to the communication infrastructure via a wireless serving base station and downlink transmissions, i.e. transmissions from the communication infrastructure to the mobile wireless communication unit via a serving base station. In TDD, the carrier frequency is subdivided in the time domain into a series of timeslots. The single carrier frequency is assigned to uplink transmissions during some timeslots and to downlink transmissions during other timeslots. An example of a communication system using this principle is the Universal Mobile Telecommunication System (UMTS). Further description of CDMA, and specifically of the Wideband CDMA (WCDMA) mode of UMTS, can be found in 'WCDMA for UMTS', Harri Holma (editor), Antti Toskala (Editor), Wiley & Sons, 2001, ISBN 0471486876.

Typically within a UMTS network, each serving base station, referred to as a NodeB, is operably coupled to a base station controller, referred to as a radio network controller (RNC), via a backhaul link. It is known for a communication capacity of such a backhaul link to be limited to less than, or equal to, that of the air-interface between the base station and wireless subscriber communication units. This situation is common in many Operator networks during early stages of a network roll-out, for example when a number of active wireless subscriber communication units do not justify an expensive high bandwidth backhaul.

Typically, within 3rd generation cellular communication systems, the backhaul link carries user plane traffic of two types:

just-in-time (JIT) traffic (for example, in 3gpp this would be Forward Access Channel (FACH), Downlink Shared Channel (DSCH), Dedicated Channel (DCH) that has to arrive at the base station within a time window for it to be transmitted over the air-interface, else it is discarded. The just-in-time traffic is scheduled on the air-interface by the base station controller.

other traffic (e.g. non just-in-time, NJIT) that should be sent to the base station as soon as possible, but will not be discarded according to the time of arrival (for example, in 3GPP this would be High Speed Downlink Shared Channel (HS-DSCH)). NJIT traffic is scheduled on the air-interface by the base station.

A problem faced, when implementing such a system, is how to share the available backhaul link bandwidth between these two types of traffic to meet the goals of:

The bandwidth being shared according to an intended ratio.
The JIT traffic should reach the base station within a desired time window.
The link should be optimally utilised.

It is known to establish a bandwidth sharing ratio, whereby each traffic type is allocated a predefined proportion of the available backhaul link bandwidth. In this manner, each traffic type is assured a certain amount of bandwidth across the communication link. However, when there is a low amount of traffic for one of the traffic types, not all of the allocated bandwidth for that traffic type will be used, even if the other traffic type has greater demand than its allocation, and as such valuable bandwidth resource is wasted.

This is particularly undesirable in a situation where a capacity of the backhaul link is limited to less than, or equal to, that of the air-interface, since it may result in not only the backhaul link bandwidth not being fully utilised, but also the air-interface bandwidth not being fully utilised.

Consequently, current techniques are suboptimal. Hence, an improved mechanism to address the problem of managing backhaul resources within a cellular network would be advantageous.

SUMMARY OF THE INVENTION

Accordingly, embodiments of the invention seek to mitigate, alleviate or eliminate one or more of the abovementioned disadvantages singly or in any combination.

According to a first aspect of the invention, there is provided a communication network element comprising traffic scheduler logic capable of scheduling transmission of a first category of queued traffic across a backhaul interface in accordance with a rate control value. The communication network element further comprises traffic manager logic capable of scheduling transmission of a second category of queued traffic across the backhaul interface in accordance with a determined backhaul bandwidth allocation, the backhaul bandwidth allocation being based on a determination of available bandwidth across the backhaul interface not required for scheduled first category traffic.

The scheduling for transmission of the first category of queued traffic across the backhaul interface by the traffic scheduler logic may comprise scheduling transmission of the first category of queued traffic across an air-interface, via the backhaul interface.

In one embodiment of the invention, employing the inventive concept improves utilisation of backhaul bandwidth resources. In one embodiment of the invention, employing the inventive concept improves a reliability of the first category of traffic arriving within a time window at, for example, a base station.

According to an optional feature of the invention, at least one of the traffic manager logic and the traffic scheduler logic may generate frame protocol messages for queued traffic scheduled for transmission across the backhaul interface.

According to an optional feature of the invention, the rate control value in accordance with which the traffic scheduler logic is capable of scheduling transmission of the first category of queued traffic may be generated based on at least one of: at least one control input, and a strategy for sharing the backhaul bandwidth between the first and second category of traffic.

According to an optional feature of the invention, the at least one control input may comprise at least one of: a mean bit rate, and a buffer occupancy value. For example, the control input may refer to one of the (optional) inputs used by, for example, the arbitrator to generate the rate control value, as opposed to the rate control value that impacts (directly) the traffic scheduler.

In one embodiment of the invention, employing the inventive concept enables a comparison to be made between the mean rate for the second category traffic and the rate required to serve all the buffered second category traffic. If the buffered second category traffic is greater then the mean rate for the second category traffic, the rate control value for the first category traffic can be reduced to allow the backlog of second category traffic to clear.

According to an optional feature of the invention, the at least one control input may comprise at least one of: a timeslot split for the first category of traffic and second category of traffic in a TDD implementation; and a backhaul interface bandwidth.

According to an optional feature of the invention, the backhaul sharing strategy may comprise at least one of: a guaranteed throughput for the second category of traffic, and a fair share of the backhaul interface bandwidth, for example where the fair share may be determined by a number of timeslots configured for at least one of the first category of traffic and second category of traffic.

According to an optional feature of the invention, the rate control value, in accordance with which the traffic scheduler logic is capable of scheduling transmission of the first category of queued traffic, may comprise a backhaul bit rate for the first category of traffic, for example a backhaul bit rate calculated by subtracting a second category of traffic cost from a determined available backhaul interface bandwidth.

According to an optional feature of the invention, the second category of traffic cost may represent a bit rate that is to be reserved for the second category of traffic.

In one embodiment of the invention, employing the inventive concept provides for a minimum guaranteed bandwidth for the second category traffic, irrespective of whether there has been recent transmissions of the second category traffic over the backhaul interface or of the presence of queued second category traffic. In this manner, if second category traffic becomes available for transmission after the scheduling of first category traffic, the minimum guaranteed bandwidth is available for second category traffic.

According to an optional feature of the invention, the backhaul bit rate for the first category of traffic may be calculated by subtracting the second category of traffic cost from the determined available backhaul interface bandwidth, once control signalling traffic has been taken into consideration. According to an optional feature of the invention, the second category of traffic cost may be calculated based on, for the second category of traffic, at least one of: a mean data rate, and a rate required to clear the current buffer occupancy.

According to an optional feature of the invention, the second category of traffic cost may be constrained to be within a minimum value and a maximum value.

In one embodiment of the invention, employing the inventive concept ensures at least some backhaul interface bandwidth is available for the first category of traffic.

According to an optional feature of the invention, the traffic scheduler logic may be capable of scheduling the first category of traffic up to a bandwidth determined by the rate control value.

According to an optional feature of the invention, the communication network element may further comprise arbitrator logic, operably coupled to the traffic scheduler logic, and capable of generating the rate control value, and to provide the rate control value to the traffic scheduler logic.

According to an optional feature of the invention, the determination of available bandwidth across the backhaul interface, upon which the backhaul bandwidth allocation to the second category of traffic is based, may be calculated by subtracting, from available bits of the backhaul interface bandwidth, at least one of: at least one buffer occupancy value for example where the at least one buffer occupancy value comprises at least one scheduled first category traffic buffer occupancy values, and at least one control signalling bandwidth allocation.

According to an optional feature of the invention, the at least one buffer occupancy value may further comprise at least one buffer occupancy value for scheduled traffic other than the first category of traffic or the second category of traffic.

According to an optional feature of the invention, the communication network element may further comprise interface manager logic, operably coupled to the traffic manager logic, and capable of calculating the backhaul bandwidth allocation, and to provide the backhaul bandwidth allocation to the traffic manager logic. The interface manager logic may be further capable of managing control signalling traffic, for example Inet traffic, provided over the backhaul interface. In one optional embodiment, the interface manager logic may be further capable of allocating backhaul interface bandwidth to traffic other than the first or second categories of traffic.

In one optional embodiment, the interface manager logic may be further capable of allocating backhaul interface bandwidth to traffic other than the first or second categories of traffic.

In one optional embodiment, the interface manager may provide a bandwidth grant limit to the at least one cell client, and upon receipt of a bandwidth grant, the at least one cell client may send at least one queued message across the backhaul interface up to the granted bandwidth limit.

In one optional embodiment, the traffic scheduler logic may schedule the transmission of the first category of traffic less often than the traffic manager logic schedules the transmission of the second category of traffic.

In one optional embodiment, the traffic scheduler logic may schedule the transmission of the first category of traffic approximately every 10 milliseconds.

In one optional embodiment, the traffic manager logic may schedule the transmission of the second category of traffic approximately every 1 msec.

In one optional embodiment, the first category of traffic may comprise 'Just-In-Time' (JIT) traffic, for example Downlink Shared CHannel (DSCH) traffic.

In one optional embodiment, the second category of traffic may comprise 'Non Just-In-Time' (NJIT) traffic, for example High Speed-Downlink Shared CHannel (HS-DSCH) traffic.

In one optional embodiment, the communication network element may support communication in one of a time division duplex code division multiple access cellular communication system or a frequency division duplex code division multiple access cellular communication system.

In one optional embodiment, the communication network element may support communication in a 3$^{rd}$ Generation Partnership Project (3GPP) cellular communication network.

In one optional embodiment, the communication network element may be one of: a radio network controller, a base station controller.

According to a second aspect of the invention, there is provided a communication system comprising a communication network element. The communication network element comprises traffic scheduler logic capable of scheduling transmission of a first category of queued traffic across a backhaul interface in accordance with a rate control value. The communication network element further comprises traffic manager logic capable of scheduling transmission of a second category of queued traffic across the backhaul interface in accordance with a determined backhaul bandwidth allocation, the backhaul bandwidth allocation being based on a determination of available bandwidth across the backhaul interface not required for scheduled first category traffic.

According to a third aspect of the invention, there is provided a method for management of backhaul resources within a communication system. The method comprises determining available bandwidth across a backhaul interface, scheduling transmission of a first category of queued traffic across the backhaul interface in accordance with a rate control value; determining an available bandwidth allocation across the backhaul interface not required for scheduled first category traffic; and scheduling transmission of a second category of queued traffic across the backhaul interface in accordance with the calculated available bandwidth allocation.

According to a fourth aspect of the invention, there is provided logic for management of backhaul resources within a communication system, wherein the logic comprises logic for determining available bandwidth across a backhaul interface and logic for scheduling transmission of a first category of queued traffic across the backhaul interface in accordance with a rate control value. The logic for management of downlink resources further comprises logic for determining an available bandwidth allocation across the backhaul interface not required for scheduled first category traffic; and logic for scheduling transmission of a second category of queued traffic across the backhaul interface in accordance with the calculated backhaul bandwidth allocation.

According to a fifth aspect of the invention, there is provided a computer program product comprising program code for supporting backhaul resource management within a communication system. The computer program product comprising program code for determining available bandwidth across a backhaul interface, scheduling transmission of a first category of queued traffic across the backhaul interface in accordance with a rate control value; determining an available bandwidth allocation across the backhaul interface not required for scheduled first category traffic; and scheduling transmission of a second category of queued traffic across the backhaul interface in accordance with the calculated backhaul bandwidth allocation.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS
OF THE INVENTION

The following description focuses on embodiments of the invention applicable to a UMTS (Universal Mobile Telecommunication System) cellular communication system, and in particular to a UMTS Terrestrial Radio Access Network (UTRAN) operating in a Time Division Duplex (TDD) mode within a 3$^{rd}$ generation partnership project (3GPP) system. However, it will be appreciated that the invention is not limited to this particular cellular communication system, but may be applied to other communication systems, for example to a Frequency Division Duplex (FDD) based cellular communication system.

Figure 1:
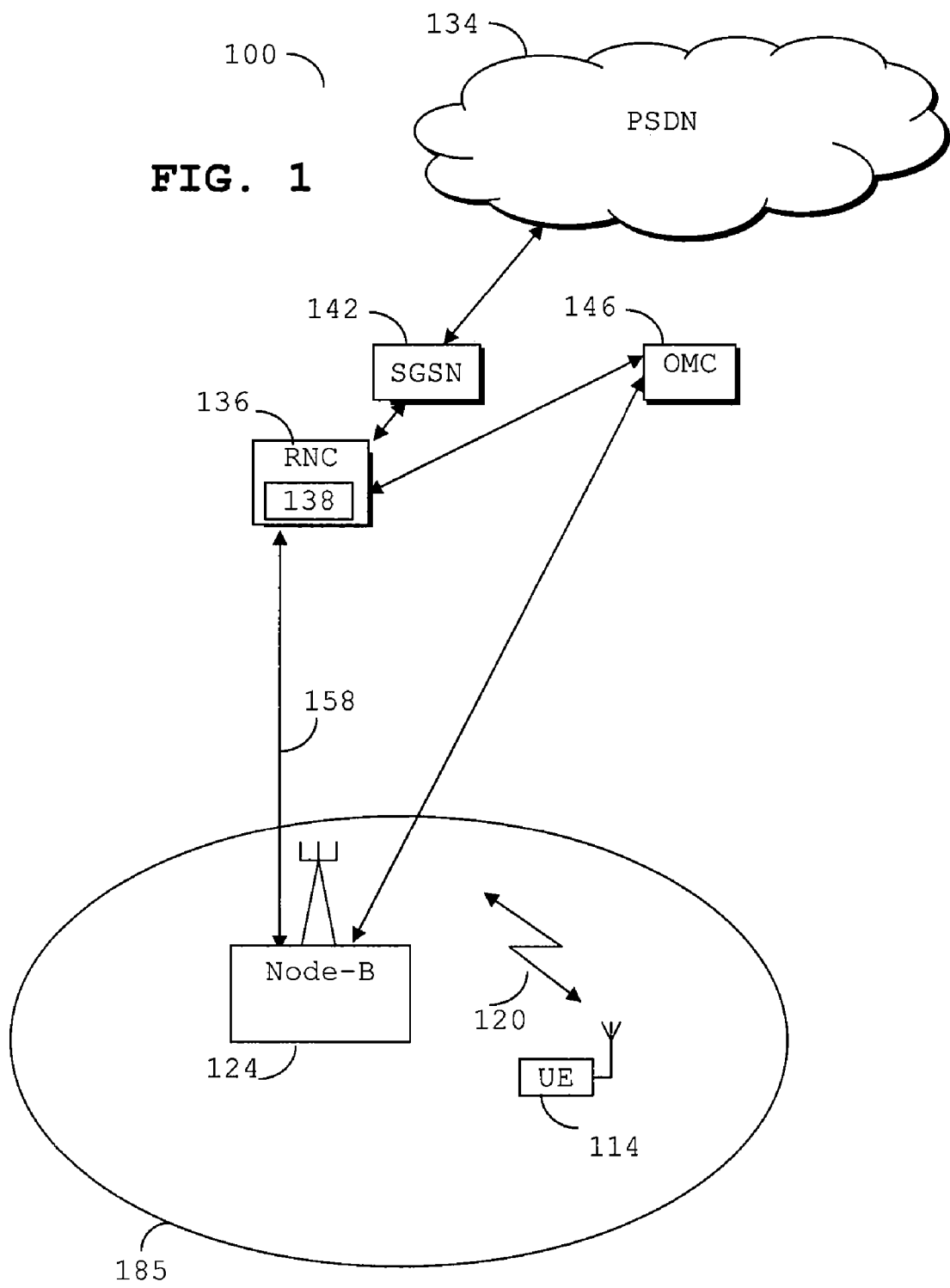
FIG. 1 illustrates a cellular-based communication system in accordance with embodiments of the invention.

Referring now to FIG. 1, a cellular-based communication system 100 is shown in outline, in accordance with embodiments of the invention.

Wireless subscriber communication units (or user equipment (UE) in UMTS nomenclature), such as UE 114, communicate over radio links 120, often referred to as air-interfaces, with a plurality of base transceiver stations, referred to under UMTS terminology as Node-Bs, such as Node-B 124. The communications system 100 may comprise many other UEs and Node-Bs, which for clarity purposes are not shown.

The wireless communication system 100, sometimes referred to as a Network Operator's Network Domain, is connected to an external network 134, for example the Internet. The Network Operator's Network Domain includes:

(i) A core network, namely at least one Gateway General Packet Radio System (GPRS) Support Node (GGSN) (not shown) and at least one Serving GPRS Support Nodes (SGSN) 142; and (ii) An access network, namely UMTS Radio network controller (RNC) 136, often referred to as a Base Station Controller, and UMTS Node-B 124.

The GGSN (not shown) or SGSN 142 is responsible for UMTS interfacing with a Public network, for example a Public Switched Data Network (PSDN) (such as the Internet) 134 or a Public Switched Telephone Network (PSTN). The SGSN 142 performs a routing and tunneling function for traffic, whilst a GGSN links to external packet networks.

The Node-Bs 124 are connected to external networks, through Radio Network Controller stations (RNC), such as RNC 136, and mobile switching centres (MSCs), such as SGSN 144. A cellular communication system will typically have a large number of such infrastructure elements where, for clarity purposes, only a limited number are shown in FIG. 1.

Each Node-B 124 contains one or more transceiver units and communicates with the rest of the cell-based system infrastructure over a backhaul link via an $I_{ub}$ interface 158, as defined in the UMTS specification.

For clarity, backhauling is concerned with transporting traffic between distributed sites (typically access points) and more centralised points within a network. Examples of backhaul links include, by way of example, connecting node-Bs to their corresponding RNCs.

In accordance with one embodiment of the invention, a wireless serving communication unit (e.g. Node-B 124) supports TDD operation on a frequency channel comprising a plurality of uplink transmission resources divided into uplink timeslots and a plurality of downlink transmission resources divided into downlink timeslots. Node-B 124 supports communication over one or more geographic areas 185, often referred to as cells.

The RNC 136 may control one or more Node-Bs 124. Each SGSN 142 provides a gateway to the external network 134. An Operations and Management Centre (OMC) 146 is operably connected to RNCs 136 and Node-Bs 124. The OMC 146 comprises processing functions and logic functionality (not shown) in order to administer and manage sections of the cellular communication system 100, as is understood by those skilled in the art.

In accordance with one embodiment of the invention, the RNC 136 comprises signal processing logic 138 adapted as described below.

Figure 2:
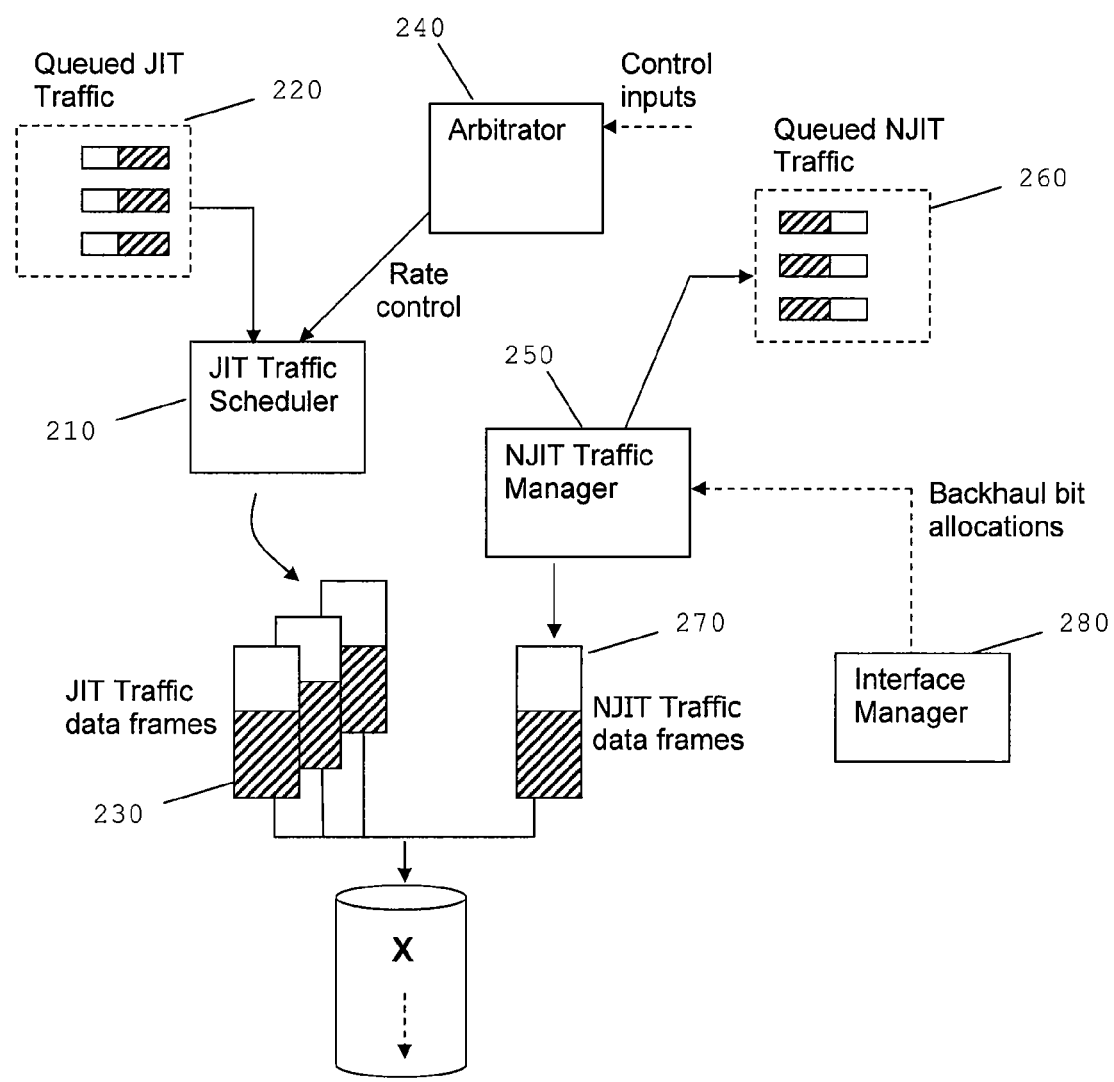
FIG. 2 illustrates a traffic scheduling architecture adapted in accordance with embodiments of the invention.

Referring now to FIG. 2, there is illustrated a traffic scheduling architecture 200 adapted to be implemented by a network element of a cellular communication system according to embodiments of the invention, for example as may be implemented by the signal processing logic 138 of the RNC 136 in FIG. 1.

For the illustrated embodiment, the traffic scheduling architecture 200 schedules a transmission of traffic across a backhaul interface of, for the illustrated embodiment, a backhaul link X, for example via $I_{ub}$ interface 158 between the RNC 136 and a Node-B 124 of FIG. 1. In particular, the traffic scheduling architecture 200 schedules the transmission of a first category of traffic and a second category of traffic.

For the illustrated embodiment, the first category of traffic comprises traffic to be transmitted over the air-interface, between Node-B 124 and the one or more UEs 114, and which is scheduled for transmission over the air-interface by, for example, the RNC 136. Such traffic is typically in a form of 'Just-In-Time' (JIT) traffic, which is required to arrive at the Node-B 124 within a specific time window in order for it to be transmitted over the air-interface, else it is discarded. Thus, the scheduling of the first category of traffic across the backhaul link may comprise scheduling of the first category of traffic across the air-interface between the Node-B 124 and at least one UE 114, via the $I_{ub}$ interface 158.

The second category of traffic for the illustrated embodiment comprises traffic to be transmitted over the air-interface, between Node-B 124 and the one or more UEs 114, and which the Node-B 124 schedules for transmission over the air-interface. Such traffic is typically in a form of 'Non Just-In-Time' (NJIT) traffic, which is required to be transmitted to the Node-B 124 as soon as possible, but which will not be discarded according to a time of arrival at the Node-B 124.

The traffic scheduling architecture 200 comprises JIT traffic scheduler logic 210. The JIT traffic scheduler logic 210 is arranged to schedule queued JIT traffic 220 for transmission over the air-interface, across backhaul link X, according to a rate control value, and generates JIT traffic data frames 230 comprising JIT traffic scheduled for transmission. For the illustrated embodiment, the rate control value is provided to the JIT traffic scheduler 210 by arbitrator logic 240.

Arbitrator logic 240, receives control inputs, such as guaranteed NJIT throughput, fair share NJIT throughput, current queued NJIT traffic volume, mean JIT and NJIT throughput, etc. Such control inputs may be provided by an operations and management centre (OMC), for example in the form of operator controlled settings, and/or based on measurements taken within the traffic scheduling architecture 200. Thus, the arbitrator logic 240 is then able to generate the rate control value based on control inputs, and in accordance with a strategy for sharing the bandwidth of backhaul link X between the JIT and NJIT traffic.

The traffic scheduling architecture 200 further comprises NJIT traffic manager logic 250. The NJIT traffic manager logic 250 is arranged to schedule queued NJIT traffic 260 for transmission across backhaul link X, according to a backhaul link bandwidth, or bit allocation, and generates NJIT traffic data frames 270 comprising NJIT traffic scheduled for transmission. For the illustrated embodiment, the backhaul bandwidth/bit allocation is provided to the NJIT traffic manager logic 250 by interface manager logic 280. In contrast to the JIT traffic scheduler logic 210, the NJIT traffic manager logic 250 does not schedule transmissions on the air-interface, only onto the backhaul link X. Air-interface scheduling (if appropriate) for NJIT traffic is performed by, for example, the Node B (not shown) to which traffic is transmitted across the backhaul link X.

The interface manager logic 280 analyses the JIT traffic data frames 230 scheduled for transmission over the backhaul link X, and determines those bits within the backhaul link X that are not allocated for use by the JIT traffic data frames 230, and allocates these free bits for use by the NJIT traffic data frames. The interface manager logic 280 then informs the NJIT traffic manager 250 of the backhaul link bits allocated for use by NJIT traffic data frames 270.

The JIT traffic scheduler 210 is substantially constrained to only generate JIT traffic data frames at a rate regulated by the rate control value. In particular, JIT traffic data frames are substantially only generated at a rate based on control inputs, and in accordance with a backhaul sharing strategy. In this manner, a share of the backhaul link bandwidth may be allocated to the JIT traffic, based on control inputs, and in accordance with a backhaul sharing strategy and a volume of JIT traffic data frames 230 is generated up to the allocated bandwidth. Conversely, by limiting the bandwidth available to JIT traffic, a fair share of the backhaul bandwidth is available for NJIT traffic data frames 270.

As previously mentioned, the input controls upon which the rate control value is based may comprise mean NJIT throughput and current queued NJIT traffic. In this manner, the bandwidth allocated to JIT traffic data frames 230 may be increased if the NJIT traffic load is light. As a result, the backhaul link capacity can be fully utilised.

Furthermore, JIT traffic data frames 230 that are generated by the JIT traffic scheduler logic 210 are effectively prioritised over NJIT traffic. Consequently, JIT traffic data frames 230 are more likely to arrive at the Node-B within the required time window, and therefore are more likely to be transmitted over the air-interface by the Node-B. The time window may be maintained by synchronisation frames that are passed over the backhaul link in both directions. Downstream synchronisation frames are treated as JIT traffic and experience a similar backhaul link delay as other JIT traffic that has been generated in response to the JIT scheduler logic 210. Thus the latency estimates made by the synchronisation frames are representative of that experienced by the JIT traffic frames. Furthermore, by giving highest priority to JIT traffic, the transfer latency of the JIT traffic has less variation, thereby improving the likelihood of it arriving within the required time window.

As will also be appreciated by a skilled artisan, in a case when JIT traffic is light, and does not require all of the backhaul link bandwidth allocated thereto, any unused bandwidth, initially allocated to JIT traffic data frames 230 will be re-allocated to NJIT traffic data frames 270 by the interface manager logic 280. In this manner, the backhaul link capacity can be fully utilised.

In accordance with one embodiment, the interface manager logic 280 may analyse the JIT traffic data frames 230 scheduled for transmission over the backhaul link X at intervals comprising a period of less than, or equal to, the air-interface scheduling period in the RNC, for example less than, or equal to ten milliseconds (10 msec.). As would be appreciated by a skilled artisan, that 1 msec may be a practical choice for some embodiments of the invention. By analysing the JIT traffic data frames 230 scheduled for transmission over the backhaul link at intervals comprising such a small period, delay in an allocation of bits to NJIT traffic data frames 270 can be substantially minimised.

Figure 3:
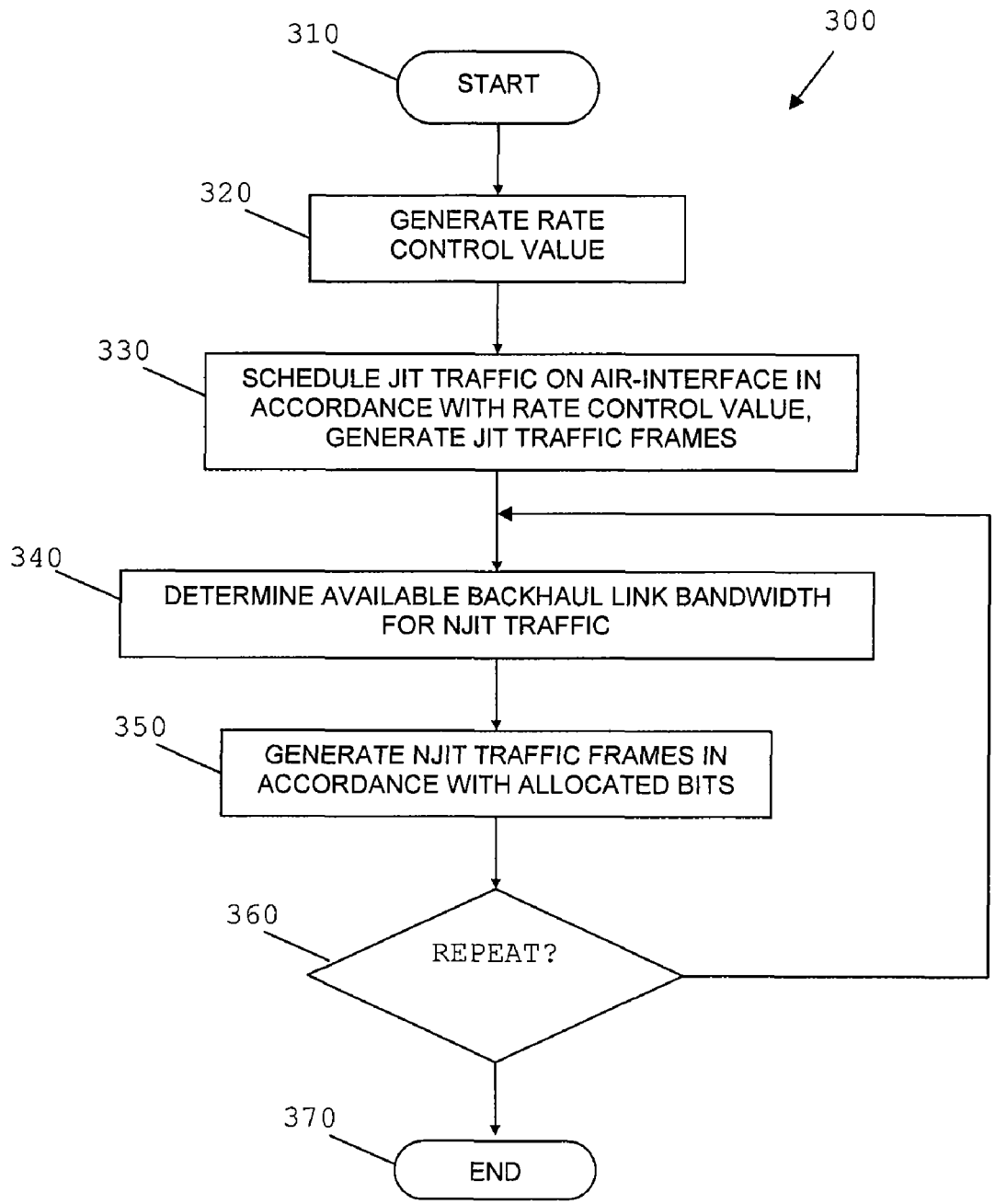
FIG. 3 illustrates a flow chart of a method for managing backhaul resources in accordance with embodiments of the invention.

Referring now to FIG. 3, there is illustrated a flowchart 300 of a method for managing backhaul resources according to embodiments of the invention. The method starts at block 310, and moves to block 320 where a rate control value is generated. The rate control value may be generated based on, for example, a backhaul sharing strategy, and control inputs such as guaranteed NJIT throughput, fair share NJIT throughput, current queued NJIT traffic, mean JIT and NJIT throughput, etc.

In block 330, a first category of traffic is scheduled for transmission in accordance with the rate control value. For the illustrated embodiment, the first category of traffic comprises traffic to be transmitted over the air-interface, between a Node-B and the one or more UEs, and which is scheduled for transmission over the air-interface by, for example, an RNC. Such traffic may typically be in a form of 'Just-In-Time' (JIT) traffic, which is required to arrive at the Node-B within a time window in order for it to be transmitted over the air-interface. Accordingly, for the illustrated embodiment, block 330 comprises scheduling JIT traffic for transmission over the air-interface, and generating JIT traffic frames for transmission over the backhaul link. Blocks 320 and 330 may be performed periodically, for example, approximately every 10 msec.

Block 340 comprises determining available bandwidth for a second category of traffic, for example bandwidth not required for the first category of traffic. For the illustrated embodiment, the second category of traffic comprises traffic to be transmitted over the air-interface, between a Node-B and one or more UEs, and which the Node-B schedules for transmission over the air-interface. Such traffic is typically in the form of 'Non Just-In-Time' (NJIT) traffic, which is required to be transmitted to the Node-B as soon as possible, but which will not be discarded according to a time of arrival at the Node-B.

Once available bandwidth has been allocated to the second category of traffic, which for the illustrated embodiment is in a form of NJIT traffic, NJIT traffic frames are generated in accordance with the allocated bandwidth, and the NJIT traffic (second category of) frames are scheduled for transmission over the backhaul link, in block 350.

Block 360 determines whether the first category of traffic is required to be scheduled again (for example it has been 10 msec since the last time the first category of traffic was scheduled for transmission). If it is determined that the first category of traffic does not require scheduling for transmission, Blocks 340 and 350 are repeated, for example approximately every 1 msec, as necessary until it is time for the first category of traffic to be scheduled for transmission. In this manner, the first category of traffic is scheduled for transmission less frequently than the second category of traffic. For the illustrated embodiment, the method then ends, at block 370. The method may then be performed again to schedule the first category of traffic.

Figure 4:
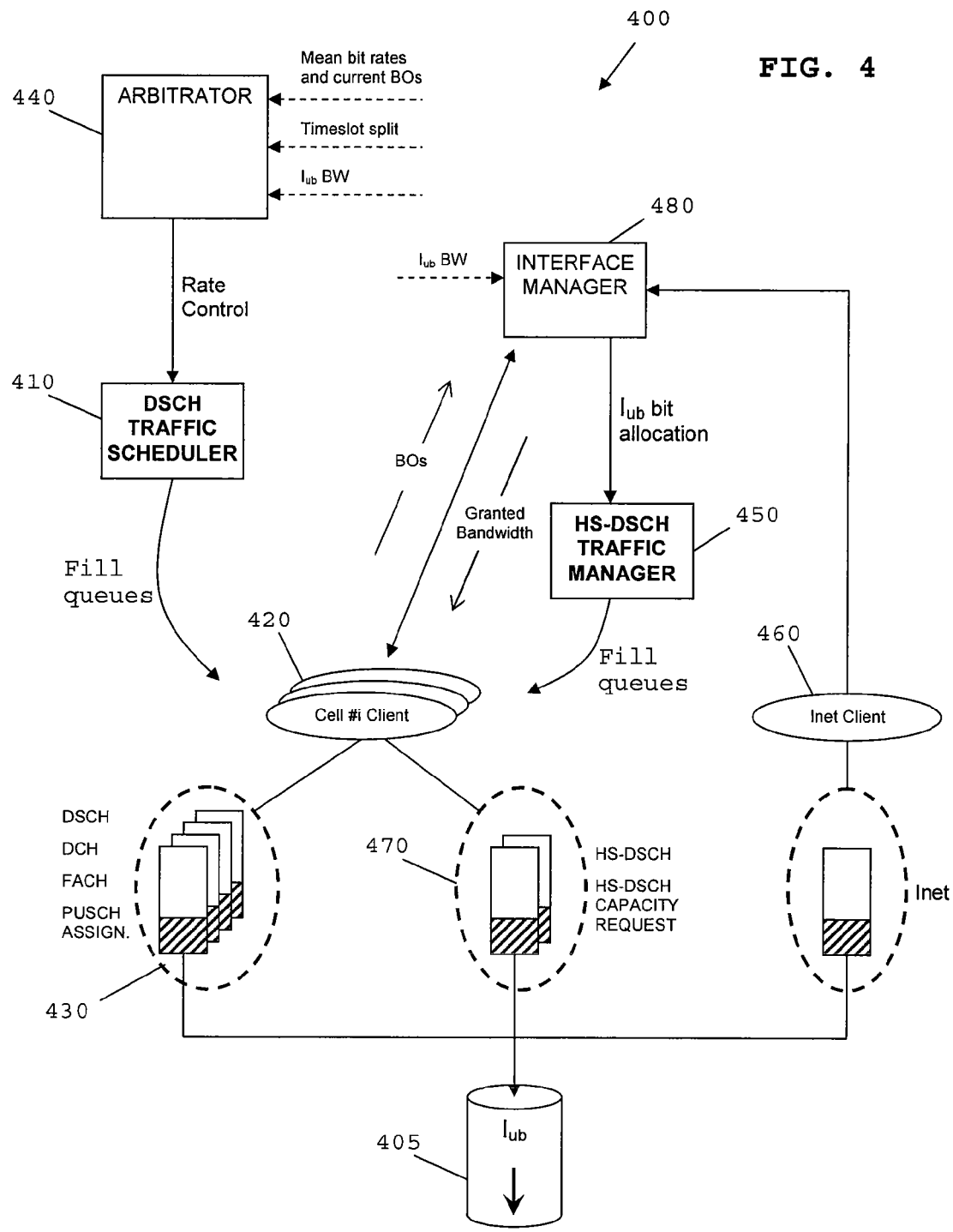
FIG. 4 illustrates a traffic scheduling architecture in accordance with embodiments of the invention.

Referring now to FIG. 4, there is illustrated a traffic scheduling architecture 400 according to embodiments of the invention, for example as may be implemented by the signal processing logic 138 of the RNC 136 in FIG. 1.

For the embodiments illustrated in FIG. 4, the traffic scheduling architecture 400 is adapted for use within a UMTS 3GPP TDD system, and manages the backhaul resources of an $I_{ub}$ interface 405 between, for example, an RNC and a Node-B. In particular, a traffic scheduling architecture 400 schedules the transmission of a first category of traffic and a second category of traffic.

For the embodiments illustrated in FIG. 4, the first category of traffic is in a form of JIT traffic comprising Downlink Shared Channel (DSCH) traffic. The second category of traffic is in a form of NJIT traffic, comprising High Speed—Downlink Shared Channel (HS-DSCH) traffic.

The traffic scheduling architecture 400 comprises DSCH traffic scheduler logic 410. The DSCH traffic scheduler logic 410 is arranged to schedule queued DSCH traffic (not shown), for example every 10 msec, for transmission across an air-interface (not shown) between the Node-B and one or more UEs, via the $I_{ub}$ interface 405, according to a rate control value, and generates DSCH Frame Protocol (FP) messages 430 for transmission. For the embodiment illustrated in FIG. 4, the rate control value is provided to the JIT traffic scheduler 410 by arbitrator logic 440.

The DSCH traffic scheduler logic 410 is adapted to perform fair sharing across multiple cells. The concept of fair sharing across multiple cells is described in WO2007/031116, which is hereby referenced and incorporated herein.

Furthermore, for the illustrated embodiment other forms of JIT traffic, such as DCH, FACH and PUSCH ASSIGN REQ traffic, herein after collectively referred to as R99 traffic, are not scheduled by the DSCH traffic scheduler logic 410, but rather are provided substantially unrestrained access to the $I_{ub}$ interface 405, as described in further detail below. In one embodiment, this may be due to, for example, the DCH being used for real-time service, such as voice services, which should not be buffered for a long period of time within the RNC. Further, in one embodiment, this may be due to the FACH being used for signalling to users, and therefore does not consume much bandwidth. Additionally, in one embodiment there may be time critical control signalling that is also provided unconstrained access to the $I_{ub}$. An example of this is the PUSCH Assignment Request signalling that configures the Node-B to receive Uplink Shared Channel transmissions.

The traffic scheduling architecture 400 further comprises HS-DSCH traffic manager logic 450. The HS-DSCH traffic manager logic 450 is arranged to schedule queued HS-DSCH traffic (not shown) for transmission across the $I_{ub}$ interface 405, according to $I_{ub}$ bandwidth allocations, and generates HS-DSCH FP messages 470 for transmission. For the embodiment illustrated, the $I_{ub}$ bandwidth allocations are provided to the HS-DSCH traffic manager logic 450 by interface manager logic 480.

For the embodiments illustrated in FIG. 4, the $I_{ub}$ interface serves a plurality of cells, and the traffic scheduling architecture 400 comprises a plurality of cell clients 420, which act as intermediaries between the interface manager logic 480 and one or more frame protocol queues. The cell clients 420 further serve queued FP messages to the $I_{ub}$ interface 405 as described in more detail below. In this manner, the cell clients 420 act as common entities controlling the transmission of individual frame protocol frames for the different traffic types in one cell.

Inet traffic is also scheduled for transmission across the $I_{ub}$ interface 405. Inet traffic represents non cell specific control signalling that is provided over the interface, such as Node-B Application Part (NBAP), Simple Network Management Protocol (SNMP) and Address Resolution Protocol signals, software downloads, etc. Accordingly, the traffic scheduling architecture 400 comprises an Inet client 460.

The arbitrator logic 440 generates the rate control value based on control inputs, and in accordance with a backhaul sharing strategy. For the embodiment illustrated in FIG. 4, the control inputs comprise mean bit rates and buffer occupancy (BO) values for scheduled traffic of:
 (i) NJIT traffic (e.g. HS-DSCH traffic and HS-DSCH capacity requests);
 (ii) JIT traffic (e.g. DSCH traffic, DCH traffic, FACH traffic, PUSH ASSIGN traffic, etc.); and
 (iii) Inet traffic.

The control inputs may further comprise a timeslot split for DSCH and HS-DSCH traffic that is determined by a Radio Resource Management entity within the RNC, and the $I_{ub}$ bandwidth. An effective $I_{ub}$ bandwidth may be produced from its true value according to the setting of an '$I_{ub}$ TransmitSpread' parameter as described below, which smoothes the data over the $I_{ub}$ in cases where the $I_{ub}$ interface 405 bandwidth is greater that the traffic load on it.

The backhaul sharing strategy may comprise, by way of example:
 (i) a minimum, or guaranteed HS-DSCH throughput; and/or
 (ii) a fair share of the $I_{ub}$ bandwidth, where the fair share is determined by a number of timeslots configured for NJIT and JIT traffic.

From the control inputs, the arbitrator logic 440 calculates an HS-DSCH COST value, which represents the bit rate that is to be reserved for HS-DSCH traffic. The HS-DSCH COST value may be calculated as follows:

Firstly, a maximum HS-DSCH COST value may be calculated based on the timeslot allocations for each of the HS-DSCH and DSCH traffic, using Equation 1 below:

$$\text{Max\_HS-DSCH\_COST} = \frac{\left(\begin{array}{c} I_{ub}\_BW_{\textit{eff}} - \\ \text{Mean\_R99\_rate} - \\ B_{\textit{guaranteed\_Inet}} \end{array}\right) n_{HS-DSCH}}{n_{HS-DSCH} + n_{DSCH}}$$ [Equation 1.]

Where:
 $I_{ub}\_BW_{\textit{eff}}$ is the effective $I_{ub}$ bandwidth:

---

If $I_{ub}$_Spreading > 0
   $I_{ub}\_BW_{\textit{eff}} = I_{ub}\_BW/I_{ub}$_Spreading
Else
   $I_{ub}\_BW_{\textit{eff}} = I_{ub}\_BW$

---

Where $I_{ub}$_Spreading is the $I_{ub}$ TransmitSpread parameter and $I_{ub}\_BW$ is the $I_{ub}$ bandwidth (kb/s), both of which may be configured by an operations and management centre, such as the OMC 146 of FIG. 1;

Mean_R99_rate (kb/s) is the sum of the mean rates for the substantially unrestrained JIT traffic frames, namely FACH, DCH AND PUSCH ASSIGN REQ traffic frames;

$B_{\textit{guaranteed\_Inet}}$ is the guaranteed rate for Inet traffic;

$n_{HS-DSCH}$ is the number of HS-DSCH timeslots (obtained from the received timeslot split); and $n_{DSCH}$ is the number of DSCH timeslots (obtained from the received timeslot split).

Having calculated the maximum value of the HS-DSCH COST, a nominal HS-DSCH COST is calculated based on a higher of the mean rate and the rate required to clear the current buffer occupancy for HS-DSCH traffic in the next 10 msec, using Equation 2 below:

Nom_HS-DSCH COST=max(mean HS-DSCH rate, HS-DSCH BO/Sched_Period) [Equation 2.]

Where:
 mean HS-DSCH rate (kb/s) and HS-DSCH BO (bits) are the values received as a control input;
 and
 Sched_Period is the scheduling period, which for the embodiment described is equal to 10 (msec.).

If the buffer occupancy (BO) for HS-DSCH traffic frames is low, the Nom_HS-DSCH COST will take the value of the mean HS-DSCH rate. Note that it is assumed that the required bit rate for HS-DSCH will be the same as the most recent average value. If the BO for scheduled HS-DSCH traffic frames is high, this indicates a backlog of scheduled HS-DSCH frames, and to clear the backlog within the next 10 ms would require a data rate of BO/10, and as such the Nom_HS-DSCH COST is set equal to this value.

Having calculated the Nom_HS-DSCH COST value, it must be constrained to be within a minimum value (Min_HS-DSCH COST), and the maximum value calculated using Equation 1 above. Min_HS-DSCH COST is calculated by summing $B_{\textit{guaranteed\_HS-DSCH}}$ for each cell (calculating $B_{\textit{guaranteed\_HS-DSCH}}$ is described in detail below). Thus, Nom_HS-DSCH COST is constrained using Equation 3 below as follows:

IF                            [Equation 3]

Nom_HS-*DSCH* COST < Min_HS-*DSCH* COST

HS-*DSCH* COST = Min_HS-*DSCH* COST

Else IF

Nom_HS-*DSCH* COST > Max_HS-*DSCH* COST

HS-*DSCH* COST = Max_HS-*DSCH* COST

Else

HS-*DSCH* COST = Nom_HS-*DSCH* COST.

Having calculated the HS-DSCH COST, the rate control to be passed to the DSCH traffic scheduler logic 410 must be calculated, which for the embodiment illustrated in FIG. 4 comprises a backhaul bit rate for the DSCH traffic (B_DSCH (kb/s)) calculated using Equation 4 below:

$B\_DSCH = I_{ub}\_BW_{\textit{eff}} - \text{Mean\_FACH\_rate} - \text{Mean\_DCH\_rate} - \text{Mean\_PUSCH\_ASSIGN\_rate} - B_{\textit{guaranteed\_Inet}} - \text{HS-DSCH COST}$ [Equation 4.]

where Mean_XXXX_rates are the mean bit rates received for the unrestrained JIT traffic frames as control inputs. In this manner, the backhaul bit rate for the DSCH traffic is calculated by subtracting the HS-DSCH COST from available bandwidth, once the substantially unrestrained traffic and Inet traffic have been taken into consideration.

As previously mentioned, the DSCH traffic scheduler logic 410 is arranged to schedule queued DSCH traffic (not shown)

for transmission across the air-interface and the $I_{ub}$ interface 405, according to a rate control value, which for the embodiment illustrated in FIG. 4 provided by the arbitrator 440 in a form of a DSCH bit rate (B_DSCH).

In one embodiment of the invention, the DSCH traffic scheduler logic 410 schedules traffic up to the bandwidth determined by the rate control value every 10 ms.

The interface manager logic 480 manages Inet traffic, allocates $I_{ub}$ bandwidth to R99 FP messages, and shares any remaining $I_{ub}$ bandwidth for HS-DSCH FP messages between cells served by the $I_{ub}$ interface 405, and provides the $I_{ub}$ interface bandwidth allocation for HS-DSCH traffic to the HS-DSCH traffic manager logic 450. The $I_{ub}$ interface bandwidth allocation for the HS-DSCH traffic is based on a determination of available bandwidth across the $I_{ub}$ interface not required for scheduled DSCH traffic or other JIT traffic, such as R99 traffic.

In particular, the determination of available bandwidth across the $I_{ub}$ interface 405 may be calculated by subtracting buffer occupancy values and control signalling bandwidth allocations from available bandwidth of the $I_{ub}$ interface bandwidth, wherein the buffer occupancy values comprise scheduled DSCH buffer occupancy values, and may further comprise buffer occupancy values for other scheduled JIT traffic, such as R99 traffic.

Each cell client 420 reports its buffer occupancies (BOs) for queued FP traffic to the interface manager logic 480, which the interface manager logic 480 uses to determine the $I_{ub}$ bandwidth utilisation, e.g. a number of $I_{ub}$ bits, that may be utilised for each cell, and signals this to each cell client 420 in a form of a bandwidth grant. In one embodiment of the invention, the cell clients 420 report their BOs to the interface manager 480 approximately every 1 msec. When a cell client 420 receives a bandwidth grant, it sends FP messages up to the granted bandwidth limit, taking the frames in a fixed priority sequence, as described in more detail below.

An Operations and Management Centre (OMC), for example the OMC 146 of FIG. 1, sets a guaranteed bandwidth for cells with HS-DSCH traffic ($B_{guaranteed\_HS\text{-}DSCH}$). This guaranteed bandwidth assumes that there are no timeslots used by DSCH traffic, and is shared out to cells in sequence. The sequence is cyclically rotated to ensure fairness between cells. Thus, if a number of cells served by the $I_{ub}$ interface 405 is Nt, then:

$$B_{guaranteed\_HS\text{-}DSCH} Nt \leq I_{ub} BW_{eff}$$

The OMC 146 also sets a guaranteed bandwidth of the $I_{ub}$ interface for Inet traffic ($B_{guaranteed\_Inet}$).

As previously mentioned, the guaranteed bandwidth for HS-DSCH traffic is set by the OMC 146, assuming there are not timeslots used by DSCH traffic. As will be appreciated by a skilled artisan, in practice the actual guaranteed bandwidth ($B_{guaranteed\_HS\text{-}DSCH}'$) available for HS-DSCH traffic varies according to the number of timeslots configured for DSCH and HS-DSCH traffic, and can be expressed in Equation 5 below as:

$$B'_{guaranteed\_HS\text{-}DSCH} = \frac{n_{HS\text{-}DSCH}}{n_{DSCH} + n_{HS\text{-}DSCH}} B_{guaranteed\_HS\text{-}DSCH} \quad \text{[Equation 5.]}$$

where:

$n_{DSCH}$ is the number of slots configured for DSCH traffic; and $n_{HS\text{-}DSCH}$ is the number of slots configured for HS-DSCH traffic.

The interface manager logic 480 calculates a number of guaranteed bits per, for example, 1 ms interval for HS-DSCH traffic and for Inet traffic, as illustrated in Equations 6 and 7 below respectively, where the guaranteed bandwidth is measured in kbits/second:

$$BITS_{guaranteed\_HS\text{-}DSCH} = B_{guaranteed\_HS\text{-}DSCH}' \quad \text{[Equation 6.]}$$

$$BITS_{guaranteed\_Inet} = B_{guaranteed\_Inet} \quad \text{[Equation 7.]}$$

As previously mentioned, each cell client 420 and the Inet client 460 sends a BO report to the interface manager logic 480, for example every 1 ms, comprising the buffer occupancy of all queued FP and Inet traffic. Upon receipt of the BO reports, and thus every 1 ms in this example, the interface manager logic 480 determines the number of bits that each cell client 420 may send, and the number of bits that the Inet client 460 may send, during the subsequent 1 ms over the $I_{ub}$ interface 405.

In this manner, each cell client 420 serves the queued FP traffic every 1 ms, until either the queue is exhausted or its granted bandwidth is reached. As previously mentioned, each cell client 420 serves the queued FP traffic in a fixed priority sequence. For example, the FP traffic may be served in the following sequence:

(i) PUSCH ASSIGN REQ
(ii) FACH FP
(iii) DSCH FP
(iv) DCH FP
(v) HS-DSCH CAPACITY REQ
(vi) HS-DSCH FP The interface manager logic 480 determines a number of bits that each cell client 420 may send, and a number of bits that the Inet client 460 may send, as follows.

Firstly, the interface manager logic 480 calculates a minimum HS-DSCH allocation for each cell ($B_{min,i}$), where 'i' indicates the cell number, using Equation 8 below:

$$B_{min,i} = \min(BO_{HS\text{-}DSCH,i}, BITS_{guaranteed\_HS\text{-}DSCH}) \quad \text{[Equation 8.]}$$

Next, the interface manager logic 480 calculates the number of bits available for FP traffic ($BITS_{FP}$), using Equation 9 below:

$$BITS_{FP} = BITS_{Iub} - \min(BO_{Inet}, BITS_{guaranteed\_Inet}) \quad \text{[Equation 9.]}$$

where:

$BITS_{Iub}$ is the number of bits available on the $I_{ub}$ interface 405 per 1 ms and is equal to $I_{ub}\_BW_{eff}$.

Next, the interface manager logic 480 calculates the number of bits available for HS-DSCH traffic ($BITS_{HS\text{-}DSCH}$) using Equation 10 below:

$$BITS_{HS\text{-}DSCH} = \max\left(\left(BITS_{FP} - \sum_{all\_cells} BO_{JIT,i}\right), 0\right) \quad \text{[Equation 10.]}$$

As previously mentioned, each cell client 420 serves queues in a priority sequence, and as such there are only bits available for HS-DSCH traffic if the aggregate R99 and DSCH traffic buffer occupancy ($BO_{JIT}$) is less than $BITS_{FP}$. Consequently, if $BITS_{HS\text{-}DSCH} = 0$, then the JIT traffic may utilise all available FP traffic bits.

Else, if $$\sum_{all\_cells} BO_{HS\text{-}DSCH,i} \leq BITS_{HS\text{-}DSCH},$$

then all HS-DSCH may be scheduled for transmission, and Inet traffic may be offered the remaining bits. Thus:

$$B_{cell,i} = BO_{HS-DSCH,i} + BO_{R99+DSCH,i} \; \forall \; i$$

$$B_{Inet} = BITS_{Iub} - \sum_{all\_cells} B_{cell,i}$$

Otherwise $$\sum_{all\_cells} BO_{HS-DSCH,i} > BITS_{HS-DSCH},$$

and as such not all HS-DSCH traffic for all cells may be sent across the $I_{ub}$ interface 405. Consequently, the available bits are divided between the cells. Firstly, the bits required for the Inet traffic are calculated:

$$B_{Inet} = \min(BO_{Inet}, BITS_{guaranteed\_Inet})$$

Next, the HS-DSCH bit allocation per cell ($BITS_{cell,HS-DSCH,i}$), is calculated, taking the cells in sequence:

$$BITS\_OFFERED_{cell,HS-DSCH,i} = \max\left(\left(BITS_{HS-DSCH} - \sum_{j=1}^{i-1} BITS_{cell,HS-DSCH,j} - \sum_{j=i+1}^{N_T} B_{min,j}\right), 0\right)$$

$$BITS_{cell,HS-DSCH,i} = \min(BITS\_OFFERED_{cell,HS-DSCH,i}, BO_{HS-DSCH,i})$$

Having calculated the HS-DSCH bit allocation per cell, the combined bit allocation per cell for HS-DSCH and R99 FP traffics ($B_{cell,i}$) is calculated:

$$B_{cell,i} = BITS_{cell,HS-DSCH,i} + BO_{R99+DSCH,i}$$

The first cell is provided the first bit of the HS-DSCH bandwidth, and is able to take all HS-DSCH bits with the exception of a minimum allocation for the other cells. The second cell is provided the next bit, and so on. For example, in a case when the $I_{ub}$ interface 405 serves three cells:

i=1 BITS_OFFERED=$BITS_{HS-DSCH}-B_{min,2}-B_{min,3}$
i=2 BITS_OFFERED=$BITS_{HS-DSCH}-B_{cell,HS-DSCH,1}-B_{min,3}$
i=3 BITS_OFFERED=$BITS_{HS-DSCH}-B_{cell,HS-DSCH,1}-B_{cell,HS-DSCH,2}$ In this manner, the bits available for HS-DSCH traffic are shared. To ensure fairness, this sequence is cyclically rotated, for example each time the interface manager logic 480 determines the number of bits that each cell client 420 may send, and the number of bits that the Inet client 460 may send as follows. Thus for consecutive 'runs', the interface manager logic 480 maps the bit allocation as follows:

Run 1 mapping is: cell 1-cell 2-cell 3;
Run 2 mapping is: cell 2-cell 3-cell 1;
Run 3 mapping is: cell 3-cell 1-cell 2;
Run 4 mapping is: cell 1-cell 2-cell 3;
Etc.

For each run, which is performed every 1 msec, the interface manager logic 480 provides each cell client 420 and the Inet client 460 with its granted bandwidth in a form of $I_{ub}$ interface bits available for the respective cell FP/Inet traffic.

As previously mentioned, the interface manager logic 480 also provides $I_{ub}$ bit allocations to the HS-DSCH traffic manager logic 450. The HS-DSCH traffic manager logic 450 takes the spare HS-DSCH bit allocations from the interface manager logic 480, and determines the HS-DSCH frame protocol messages that should be generated. These generated frame protocol messages are then passed into the frame protocol queues, where they are serviced by the appropriate cell clients 420.

The HS-DSCH traffic manager logic 450 may be able to apply different service disciplines in this action. For example, in one embodiment of the invention, the HS-DSCH traffic manager logic 450 may operate using a single queue for each cell that is served on a first-come first-served fashion by HS-DSCH traffic. Alternatively, in another embodiment of the invention, a weighted fair queuing method may be implemented whereby different priorities of the queued data, such as based on Common Transport CHannel Priority Indicators (CmCH-PI) or Scheduling Priority Indicator (SPI).

Figure 5:
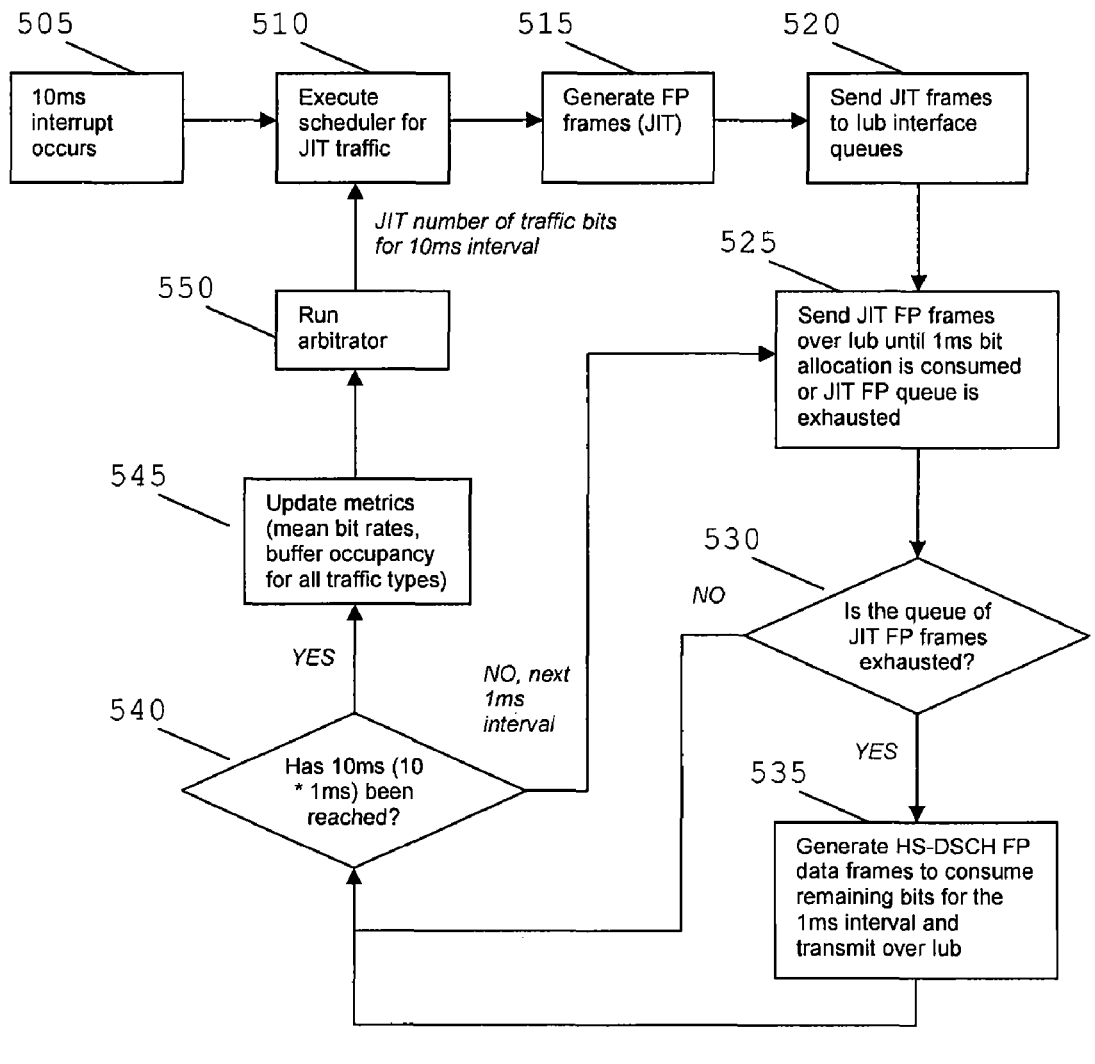
FIG. 5 illustrates a flow chart of a method for managing backhaul resources in accordance with embodiments of the invention.

Referring now to FIG. 5, there is illustrated a flowchart 500 of a method for managing backhaul resources according to embodiments of the invention For the method illustrated in FIG. 5, JIT traffic is scheduled for transmission over an air-interface via an $I_{ub}$ interface, in block 510. For the illustrated embodiment, the scheduling of JIT traffic is executed every 10 msec, and is triggered by an interrupt, in block 505.

As a result of the scheduling of JIT traffic, one or more DSCH frames are generated, in block 515. The one or more DSCH frames are then stored in $I_{ub}$ interface frame protocol queues, in block 520.

The $I_{ub}$ frame protocol queues are served on a 1 msec basis, in blocks 525 to 540. Thus, every 1 msec, the JIT frames are passed over the $I_{ub}$ interface, in block 525, until the number of bits supported by the $I_{ub}$ interface in 1 ms has been reached, or the JIT frame protocol queues have been exhausted. If in block 530 it is determined that the JIT frame protocol queues have been exhausted, NJIT frame protocol queues are served, along with the Inet queue if bits remain after exhausting the NJIT queues, in block 535.

In block 540, it is determined whether 10 ms has passed since JIT traffic was scheduled for transmission (in block 510). If 10 msec has not passed, the method moves back to block 525.

If 10 msec has passed since JIT traffic was scheduled for transmission, metrics are updated, in block 545, and the arbitrator is re-run, in block 550, to generate a new control input for the new run of the scheduler, in block 510.

As will be appreciated by a skilled artisan, to provide fair sharing between R99, DSCH and HS-DSCH traffic, the guaranteed HS-DSCH throughput should be set well below the maximum fair share value. In this manner, when there is little HS-DSCH traffic, the bandwidth can be used by JIT (R99 and DSCH) traffic instead. However, in such a configuration there is a latency impact. For example, where the DSCH traffic scheduler logic 410 schedules traffic up to the bandwidth determined by the rate control value every 10 ms, low HS-DSCH traffic will result in a large JIT traffic generation in the next 10 ms. If during this 10 ms period there is a rapid generation of HS-DSCH FP traffic, this HS-DSCH FP traffic cannot all be served until the JIT bandwidth has been reduced by the arbitrator logic 440. This latency impact may be reduced by increasing the guaranteed HS-DSCH bandwidth.

Various scenarios of a traffic scheduling architecture will now be described in accordance with embodiments of the invention, where the traffic scheduling architecture comprises an 8 Mb/s $I_{ub}$ interface, and DSCH and HS-DSCH timeslots are allocated equal numbers of, e.g. 4 slots each, and where JIT traffic load is assumed to be light. Furthermore, the DSCH traffic scheduler logic schedules traffic up to a bandwidth determined by the rate control value every 10 msec, whilst each of the cell/Inet clients 420 provides BO reports to the interface manager logic 450 every 1 msec, and the interface manager logic 450 grants $I_{ub}$ bandwidth to the cell/Inet clients 420 every 1 msec.

In a first scenario, both DSCH and HS-DSCH traffic loads are heavy. The HS-DSCH COST value will be equal to its maximum value, approximately 4 Mb/s, which is its fair share of the $I_{ub}$ bandwidth. Consequently, the DSCH traffic scheduler logic will be offered a fair share of the $I_{ub}$ bandwidth, also approximately 4 Mb/s, all of which it will use due to the heavy DSCH traffic load. When the DSCH traffic scheduler logic passes the scheduled traffic to the FP layer, it is typically in bursts. In this manner, for the first 5 msec, only DSCH traffic load will be served to the $I_{ub}$ interface. The HS-DSCH traffic load will subsequently be served to the $I_{ub}$ interface for the next consecutive 5 msec.

For the next scenario, the HS-DSCH traffic load drops, whilst the DSCH traffic load remains heavy. The HS-DSCH COST will thus now fall, as the HS-DSCH mean rate drops and the HS-DSCH buffer occupancy falls close to zero. More bandwidth is therefore offered to the DSCH traffic scheduler logic. Since the DSCH traffic load has remained high, there is a significant amount of queued DSCH traffic, and as such the DSCH traffic scheduler logic uses the offered bandwidth to schedule the queued DSCH traffic. In this manner, even though the HS-DSCH traffic load is low, the $I_{ub}$ bandwidth is fully utilised, provided that the DSCH rate is not limited by the air-interface bandwidth.

In a further scenario, the HS-DSCH traffic load rises again, with the DSCH traffic load remaining heavy. Accordingly, the HS-DSCH and the DSCH traffic load will be offered equal, fair shares of the $I_{ub}$ bandwidth. The HS-DSCH COST may thus, rise rapidly once a large burst of HS-DSCH data arrives at the FP layer, and so, although there may be some degree of latency in serving the queued HS-DSCH traffic over the $I_{ub}$ interface, any backlog due to such a burst of HS-DSCH traffic is able to be clawed back.

In the next scenario, the DSCH traffic load now drops, whilst the HS-DSCH traffic remains high. If the DSCH traffic load drops sufficiently, it will not utilise all of the $I_{ub}$ bandwidth allocated to it. Consequently, any free $I_{ub}$ bandwidth can be utilised for HS-DSCH traffic, thereby enabling the HS-DSCH throughput to increase above its fair share. In this manner, any backlog in queued HS-DSCH traffic may be reduced, and the $I_{ub}$ bandwidth is fully utilised, even when the DSCH traffic load is low.

In an alternative embodiment of the invention, the traffic scheduling architecture may be arranged to be biased towards HS-DSCH traffic. For example, if the guaranteed HS-DSCH throughput is set equal to the maximum, the HS-DSCH will receive at least its 'fair' share of the $I_{ub}$ bandwidth, irrespective of the HS-DSCH buffer occupancy. The DSCH is offered its 'fair' share, and no more. Thus, in this embodiment, HS-DSCH traffic is able to exploit any bandwidth not used by R99/DSCH traffic, but not vice versa.

It will be appreciated that, for clarity purposes, the above description has described embodiments of the invention with reference to different logical units and processes. However, it will be apparent that any suitable distribution of functionality between different logical units or processes, for example with respect to the JIT traffic scheduler logic or NJIT traffic manager logic, may be used without detracting from the invention. Hence, references to specific logical units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although one embodiment of the invention traffic scheduling architecture is adapted for use within a UMTS 3GPP TDD system, the inventive concept is not restricted to this embodiment. For example, future evolutions of UTRA 3GPP (currently referred to as 'long term evolution' (LTE)) will also be divided into timeslots (or other such named time portions), and will therefore be able to benefit from the concept described hereinbefore.

The inventive concept provides at least one or more of the following advantages:
  (i) Improved utilisation of backhaul resources;
  (ii) Just-in-time traffic data frames more likely to arrive at destination within required time window; and/or
  (iii) Improved reliability of synchronisation mechanisms.

Figure 6:
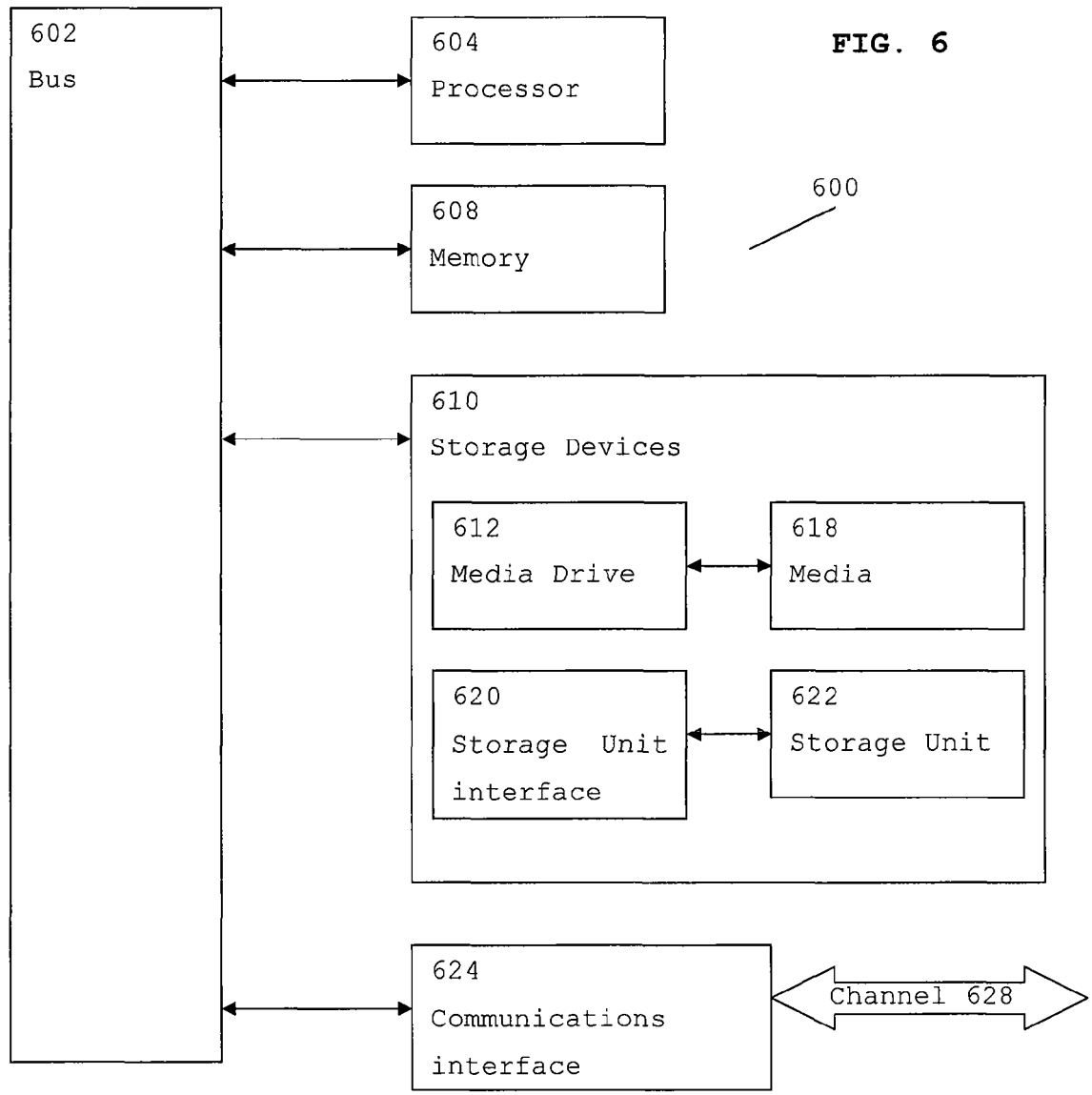
FIG. 6 illustrates a typical computing system that may be employed to implement processing functionality in accordance with embodiments of the invention.

FIG. 6 illustrates a typical computing system 600 that may be employed to implement processing functionality in embodiments of the invention. Computing systems of this type may be used in Node-Bs (in particular, the scheduler of the Node-B), core network elements, such as the GGSN, and RNCs, for example. Those skilled in the relevant art will also recognize how to implement the invention using other computer systems or architectures. Computing system 600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communications medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory (ROM) or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 618 may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a universal serial bus (USB) port), a PCMCIA slot and card, etc. Software and data transferred via communications interface 624 are in the form of signals which can be electronic, electromagnetic, and optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 608, storage device 618, or storage unit 622. These and other forms of computer-readable media may store one or more instructions for use by processor 604, to cause the processor to perform specified operations. Such instructions, generally referred to as 'computer program code' (which may be grouped in the form of computer programs or other groupings), when executed, enable the computing system 600 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

We claim:

1. A communication network element comprising:
   traffic scheduler logic operable to schedule transmission of a first category of queued traffic across a backhaul interface in accordance with a rate control value, wherein the rate control value is based on at least one of:
      at least one control input, wherein the at least one control input comprises at least one of a mean bit rate and a buffer occupancy value for at least one of:
      not-just-in-time (NJIT) traffic;
      just-in-time (JIT) traffic; and
      control signalling traffic, and
      a strategy for sharing the backhaul interface bandwidth between the first and second categories of traffic; and
   traffic manager logic operable to schedule transmission of a second category of queued traffic across the backhaul interface in accordance with a determined backhaul bandwidth allocation,
   wherein the backhaul bandwidth allocation is based upon a determination of available bandwidth across the backhaul interface, and the available bandwidth is not required for scheduled first category traffic.

2. The communication network element of claim 1, wherein scheduling transmission of the first category of queued traffic across the backhaul interface by the traffic scheduler logic comprises scheduling transmission of the first category of queued traffic across an air-interface, via the backhaul interface.

3. The communication network element of claim 1, wherein at least one of the traffic manager logic and the traffic scheduler logic generate frame protocol messages for queued traffic scheduled for transmission across the backhaul interface.

4. The communication network element of claim 1, wherein the backhaul sharing strategy comprises at least one of:
   a guaranteed throughput for the second category of traffic, and
   a fair share of the backhaul interface bandwidth.

5. The communication network element of claim 4, wherein the fair share is determined by a number of timeslots configured for at least one of the first category of traffic and the second category of traffic.

6. The communication network element of claim 1, wherein the rate control value comprises a backhaul bit rate for the first category of traffic.

7. The communication network element of claim 6, wherein the backhaul bit rate for the first category of traffic is calculated by subtracting a second category of traffic cost from a determined available backhaul interface bandwidth.

8. The communication network element of claim 7, wherein the second category of traffic cost represents a bit rate that is to be reserved for the second category of traffic.

9. The communication network element of claim 7, wherein the backhaul bit rate for the first category of traffic is calculated by subtracting the second category of traffic cost from the determined available backhaul interface bandwidth, based on control signalling traffic.

10. The communication network element of claim 9, wherein the second category of traffic cost is calculated based on, for the second category of traffic, at least one of:
    a mean data rate, and
    a rate required to clear a current buffer occupancy.

11. The communication network element of claim 10, wherein the second category of traffic cost is constrained to be within a minimum value and a maximum value.

12. The communication network element of claim 1, wherein the traffic scheduler logic is operable to schedule the first category of traffic up to a bandwidth determined by the rate control value.

13. The communication network element of claim 1, further comprising arbitrator logic operably coupled to the traffic scheduler logic, wherein the arbitrator logic is operable to generate the rate control value, and further operable to provide the rate control value to the traffic scheduler logic.

14. The communication network element of claim 1, wherein the determination of available bandwidth across the backhaul interface, upon which the backhaul bandwidth allocation is based, is calculated by subtracting, from available bits of the backhaul interface bandwidth, at least one of:
    at least one buffer occupancy value, and
    at least one control signalling bandwidth allocation.

15. The communication network element of claim 14, wherein the at least one buffer occupancy value comprises at least one scheduled first category traffic buffer occupancy value.

16. The communication network element of claim 14, wherein the at least one buffer occupancy value comprises at least one buffer occupancy value for scheduled traffic other than the first category of traffic or the second category of traffic.

17. A communication network element comprising:
   traffic scheduler logic operable to schedule transmission of a first category of queued traffic across a backhaul interface in accordance with a rate control value;
   traffic manager logic operable to schedule transmission of a second category of queued traffic across the backhaul interface in accordance with a determined backhaul bandwidth allocation,
   interface manager logic operably coupled to the traffic manager logic, wherein the interface manager logic is operable to calculate the backhaul bandwidth allocation, to provide the backhaul bandwidth allocation to the traffic manager logic, and to manage control signalling traffic provided over the backhaul interface, wherein the interface manager logic is coupled to at least one cell client, wherein the at least one cell client is operable to act as an intermediary between the interface manager logic and at least one frame protocol queue and the at least one cell client is operable to report the at least one buffer occupancy value for queued traffic to the interface manager logic;
   wherein the backhaul bandwidth allocation is based upon a determination of available bandwidth across the backhaul interface, and the available bandwidth is not required for scheduled first category traffic.

18. The communication network element of claim 17, wherein the interface manager logic is further operable to allocate backhaul interface bandwidth to traffic other than the first category or second category of traffic.

19. The communication network element of claim 17, wherein the interface manager is operable to provide a bandwidth grant limit to the at least one cell client, and upon receipt of a bandwidth grant, the at least one cell client is operable to send at least one queued message across the backhaul interface up to the granted bandwidth limit.

20. The communication network element of claim 1, wherein the traffic scheduler logic is operable to schedule the transmission of the first category of traffic less often than the traffic manager logic is operable to schedule the transmission of the second category of traffic.

21. The communication network element of claim 1, wherein the traffic scheduler logic is operable to schedule the transmission of the first category of traffic approximately every 10 milliseconds.

22. The communication network element of claim 1, wherein the traffic manager logic is operable to schedule the transmission of the second category of traffic approximately every 1 millisecond.

23. The communication network element of claim 1, wherein the first category of traffic comprises traffic scheduled on an air-interface by a base station controller.

24. The communication network element of claim 1, wherein the first category of traffic comprises 'Just-In-Time' (JIT) traffic.

25. The communication network element of claim 24, wherein the first category of traffic comprises Downlink Shared Channel (DSCH) traffic.

26. The communication network element of claim 1, wherein the second category of traffic comprises traffic scheduled on an air-interface by a base station.

27. A communication network element comprising:
   traffic scheduler logic operable to schedule transmission of a first category of queued traffic across a backhaul interface in accordance with a rate control value;
   traffic manager logic operable to schedule transmission of a second category of queued traffic across the backhaul interface in accordance with a determined backhaul bandwidth allocation, wherein the second category of traffic comprises 'Non Just-In-Time' (NJIT) traffic;
   wherein the backhaul bandwidth allocation is based upon a determination of available bandwidth across the backhaul interface, and the available bandwidth is not required for scheduled first category traffic.

28. The communication network element of claim 27, wherein the second category of traffic comprises High Speed-Downlink Shared Channel (HS-DSCH) traffic.

29. The communication network element of claim 1, wherein the communication network element is operable to support communication in a time division duplex code division multiple access cellular communication system.

30. The communication network element of claim 1, wherein the communication network element is operable to support communication in a frequency division duplex code division multiple access cellular communication system.

31. The communication network element of claim 1, wherein the communication network element is operable to support communication in a 3rd Generation Partnership Project (3GPP) cellular communication network.

32. The communication network element of claim 1, wherein the communication network element comprises one of:
   a radio network controller,
   a base station controller.

33. The communication network element of claim 32, wherein the backhaul interface comprises an $I_{ub}$ interface.

34. A communication system comprising a communication network element according to claim 1.

35. A method for management of backhaul resources within a communication system, the method comprising:
   at a network element:
   determining available bandwidth across a backhaul interface;
   scheduling transmission of a first category of queued traffic across the backhaul interface in accordance with a rate control value, wherein the rate control value is generated based upon at least one of:
      at least one control input that comprises at least one of a mean bit rate and a buffer occupancy value for at least one of:
         not-just-in-time (NJIT) traffic;
         just-in-time (JIT) traffic; and
         Control signalling traffic,
      a strategy for sharing the backhaul interface bandwidth between the first and second categories of traffic;
   determining an available bandwidth allocation across the backhaul interface, wherein the available bandwidth allocation is not required for scheduled first category traffic; and
   scheduling transmission of a second category of queued traffic across the backhaul interface in accordance with the available bandwidth allocation.

36. The method of claim 35, wherein scheduling transmission of the first category of queued traffic across the backhaul interface comprises scheduling transmission of the first category of queued traffic across an air-interface, via the backhaul interface.

37. The method of claim 35, wherein scheduling transmission of queued traffic comprises generating frame protocol messages for transmission across the backhaul interface.

38. The method of claim 35, wherein the at least one control input comprises at least one of:
   a timeslot split for the first category of traffic and the second category of traffic; and
   a backhaul interface bandwidth.

39. The method of claim 35, wherein the strategy for sharing the backhaul comprises at least one of:
   determining a guaranteed throughput for the second category of traffic, and
   determining a fair share of the backhaul interface bandwidth.

40. The method of claim 39, wherein determining the fair share comprises determining a number of timeslots configured for at least one of the first category of traffic and the second category of traffic.

41. The method of claim 35, wherein the rate control value comprises a backhaul bit rate for the first category of traffic.

42. The method of claim 41, further comprising calculating the backhaul bit rate for the first category of traffic by subtracting a second category of traffic cost from a determined available backhaul interface bandwidth.

43. The method of claim 42, wherein the second category of traffic cost represents a bit rate that is to be reserved for the second category of traffic.

44. The method of claim 43, further comprising calculating the backhaul bit rate for the first category of traffic by subtracting the second category of traffic cost from the determined available bits of the backhaul interface bandwidth, based on traffic other than of the first or second categories of traffic.

45. The method of claim 44, further comprising calculating the second category of traffic cost based upon, for the second category of traffic, at least one of a higher of:
   a mean data rate, and
   a rate required to clear a buffer occupancy.

46. The method of claim 45, further comprising constraining the second category of traffic cost to be within a minimum value and a maximum value.

47. The method of claim 35, further comprising scheduling the first category of traffic up to a bandwidth determined by the rate control value.

48. The method of claim 35, wherein determining available bandwidth across the backhaul interface comprises subtracting, from available bandwidth of the backhaul interface bandwidth, at least one of:
   at least one buffer occupancy value, and
   at least one control signalling bandwidth allocation.

49. The method of claim 48, wherein the at least one buffer occupancy value comprises at least one scheduled first category traffic buffer occupancy value.

50. The method of claim 48, wherein the at least one buffer occupancy value further comprises at least one buffer occupancy value for scheduled traffic other than the first category of traffic or the second category of traffic.

51. The method of claim 35, wherein scheduling transmission of the first category of traffic is performed less often than scheduling transmission of the second category of traffic.

52. The method of claim 35, wherein scheduling transmission of the first category of traffic is performed approximately every 10 milliseconds.

53. The method of claim 35, wherein scheduling transmission of the second category of traffic is performed approximately every 1 millisecond.

54. The method of claim 35, wherein the first category of traffic comprises traffic scheduled over an air-interface by a base station controller.

55. The method of claim 35, wherein the first category of traffic comprises 'Just-In-Time' (JIT) traffic.

56. The method of claim 53, wherein the first category of traffic comprises Downlink Shared Channel (DSCH) traffic.

57. The method of claim 35, wherein the second category of traffic comprises traffic scheduled on an air-interface by a base station.

58. A method for management of backhaul resources within a communication system, the method comprising:
   at a network element:

determining available bandwidth across a backhaul interface;
scheduling transmission of a first category of queued traffic across the backhaul interface in accordance with a rate control value;
determining an available bandwidth allocation across the backhaul interface, wherein the available bandwidth allocation is not required for scheduled first category traffic; and
scheduling transmission of a second category of queued traffic across the backhaul interface in accordance with the available bandwidth allocation, wherein the second category of traffic comprises 'Non Just-In-Time' (NJIT).

59. The method of claim 58, wherein the second category of traffic comprises High Speed-Downlink Shared Channel (HS-DSCH) traffic.

60. The method of claim 35, wherein the method is applied to a time division duplex code division multiple access cellular communication system.

61. The method of claim 35, wherein the method is applied to a communication system in a 3rd Generation Partnership Project (3GPP) cellular communication network.

62. The method of claim 35, wherein the backhaul interface comprises an $I_{ub}$ interface.

* * * * *

UNITED STATES PATENT AND TRADEMARK OFFICE
CERTIFICATE OF CORRECTION

| | |
|---|---|
| PATENT NO. | : 7,948,962 B2 |
| APPLICATION NO. | : 11/849184 |
| DATED | : May 24, 2011 |
| INVENTOR(S) | : Stephen R. Calvert, Peter J. Legg and Mark Latham |

Page 1 of 1

It is certified that error appears in the above-identified patent and that said Letters Patent is hereby corrected as shown below:

IN THE CLAIMS:

Column 23, Claim 35, Line 41: Change "Control" to -- control --.

Signed and Sealed this
Fourth Day of October, 2011

David J. Kappos
*Director of the United States Patent and Trademark Office*